US008464323B2

(12) United States Patent
Abe (10) Patent No.: US 8,464,323 B2
(45) Date of Patent: Jun. 11, 2013

(54) AUTHENTICATION APPARATUS (75) Inventor: Narishige Abe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/929,086

(22) Filed: Dec. 29, 2010

(65) Prior Publication Data
US 2011/0162068 A1 Jun. 30, 2011

Related U.S. Application Data (63) Continuation of application No. PCT/JP2008/061828, filed on Jun. 30, 2008.

(51) Int. Cl.
G06F 21/00 (2006.01)

(52) U.S. Cl.
USPC ............... 726/5; 726/19; 713/168; 713/186; 455/411; 705/35; 709/229; 380/258

(58) Field of Classification Search
USPC ........................................... 726/5, 19
See application file for complete search history.

(56) References Cited

U.S. PATENT DOCUMENTS

| | | | | |
|---|---|---|---|---|
| 5,608,811 A * | 3/1997 | Kamei | ........................... | 382/124 |
| 5,825,924 A * | 10/1998 | Kobayashi | ........................... | 382/219 |
| 2003/0161502 A1 * | 8/2003 | Morihara et al. | ............ | 382/115 |
| 2004/0042645 A1 * | 3/2004 | Wang | ........................... | 382/125 |
| 2004/0068669 A1 * | 4/2004 | Uchida | ........................... | 713/202 |
| 2004/0228508 A1 * | 11/2004 | Shigeta | ........................... | 382/124 |
| 2006/0232689 A1 | 10/2006 | Ito et al. | | |
| 2007/0189586 A1 | 8/2007 | Monden | | |
| 2010/0332487 A1 * | 12/2010 | Monden | ........................... | 707/758 |

FOREIGN PATENT DOCUMENTS

| | | |
|---|---|---|
| JP | 5-181956 | 7/1993 |
| JP | 9-62836 | 3/1997 |
| JP | 10-334237 | 12/1998 |
| JP | 2005-51379 | 2/2005 |
| JP | 2006-72553 | 3/2006 |
| JP | 2006-72555 | 3/2006 |
| JP | 2006-303581 | 11/2006 |
| WO | 2005/086091 A1 | 9/2005 |

OTHER PUBLICATIONS

Jiang et al. "Fingerprint minutiae matching based on the local and global structures", Pattern Recognition, 2000. Proceedings. 15th International Conference on, Date of Conference: 2000, vol. 2, pp. 1038-1041 vol. 2.*
International Search Report for PCT/JP2008/061828, mailed Aug. 12, 2008.
Chinese Office Action for application No. 200880130127.8 issued Dec. 28, 2012.
Japanese Office Action for application No. 2010-518834 mailed Feb. 19, 2013.

* cited by examiner

*Primary Examiner* — Morshed Mehedi
(74) *Attorney, Agent, or Firm* — Staas & Halsey LLP (57) ABSTRACT

An authentication apparatus performs local and global corrections on image data. Local correction uses the shape of a local line indicated by line information contained in a neighboring region on image data whose feature value extracted from the shape of a line is used for authentication. Global correction uses the shape of a global line indicated by line information contained in a region larger than the neighboring region. The authentication apparatus calculates the difference between line information contained in image data corrected by local correction and line information contained in image data corrected by global correction and compares the difference with a threshold. If the difference is less than the threshold, the authentication apparatus outputs, as line information contained in image data, line information corrected by local correction and, if the difference is greater, it outputs, as line information contained in image data, line information corrected by global correction.

1 Claim, 8 Drawing Sheets

|  |  |  |
|---|---|---|
| -1 | -2 | -1 |
| 0 | 0 | 0 |
| 1 | 2 | 1 |

(1)

|  |  |  |
|---|---|---|
| -1 | 0 | 1 |
| -2 | 0 | 2 |
| -1 | 0 | 1 |

| 1/14 | 2/14 | 1/14 |
|---|---|---|
| 2/14 | 2/14 | 2/14 |
| 1/14 | 2/14 | 1/14 |

AUTHENTICATION APPARATUS

CROSS-REFERENCE TO RELATED APPLICATIONS

This application is a continuation of International Application No. PCT/JP2008/061828, filed on Jun. 30, 2008, the entire contents of which are incorporated herein by reference.

FIELD

The embodiments discussed herein are directed to an authentication apparatus.

BACKGROUND

There is a known correction method of improving the precision of authentication by correcting image data including characteristic line information (e.g., fingerprints or palm prints, finger veins, palm veins, vascular patterns) that is used for the authentication. For example, local correction for correcting image data using local information and global correction for correcting image data using global information are known.

Specifically, with the local correction, an apparatus performs correction, for each region of the image data, on characteristic line information contained in a region using characteristic line information that is contained in a neighboring region. The correction is performed by using, for example, a smoothing filter. With the global correction, an apparatus performs correction using line information contained in a larger region than a neighboring region. The correction is performed by using, for example, modeling using a formula.

However, with the conventional methods described above, there is a problem in that, depending on the quality of the image that is used for the authentication, optimum correction cannot be obtained.

For example, with the local correction described above, because noise that is larger than a smoothing filter cannot be corrected, the correction is not suitable for an image that contains a large amount of noise. Furthermore, with the global correction described above, for example, because detailed line information cannot be maintained in accordance with a correction process, the correction is not suitable for a high quality image, which does not contain a large amount of noise.

Patent Document 1: International Publication Pamphlet No. WO 2005/086091 (Page 13 and FIG. 5)
Patent Document 2: Japanese Laid-open Patent Publication No. 2006-72553 (Pages 1 to 5 and FIG. 1)
Patent Document 3: Japanese Laid-open Patent Publication No. 10-334237 (Pages 1 to 8 and FIG. 1)
Patent Document 4: Japanese Laid-open Patent Publication No. 5-181956 (Pages 1 to 4 and FIG. 1)
Patent Document 5: Japanese Laid-open Patent Publication No. 9-62836 (Pages 1 to 3 and FIG. 1)

SUMMARY

According to an aspect of an embodiment of the invention, an authentication apparatus includes a first correction unit that performs a correction, for each region obtained by dividing image data whose feature value extracted from the shape of a line is used for authentication, on line information indicating the shape of a line contained in a region by using the shape of a local line indicated by line information contained in a neighboring region of the region; a second correction unit that performs a correction, for the image data, on line information contained in the region by using the shape of a global line indicated by line information contained in a region larger than the neighboring region; a calculating unit that calculates a difference between line information that is contained in the image data corrected by the first correction unit and line information that is contained in the image data corrected by the second correction unit; and an output unit that compares the difference calculated by the calculating unit with a threshold and, if the difference is less than the threshold, outputs, as line information contained in the image data, line information corrected by the first correction unit and, if the difference is greater than the threshold, outputs, as line information contained in the image data, line information corrected by the second correction unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiments of the present invention will be explained with reference to accompanying drawings. In the following, the outline of the authentication apparatus according to the embodiments, the configuration of the authentication apparatus, and the flow of the processing thereof will be described in the order they are listed in this sentence. Subsequently, another embodiment will be described.

[a] First Embodiment

Outline of Authentication Apparatus

Figure 1:
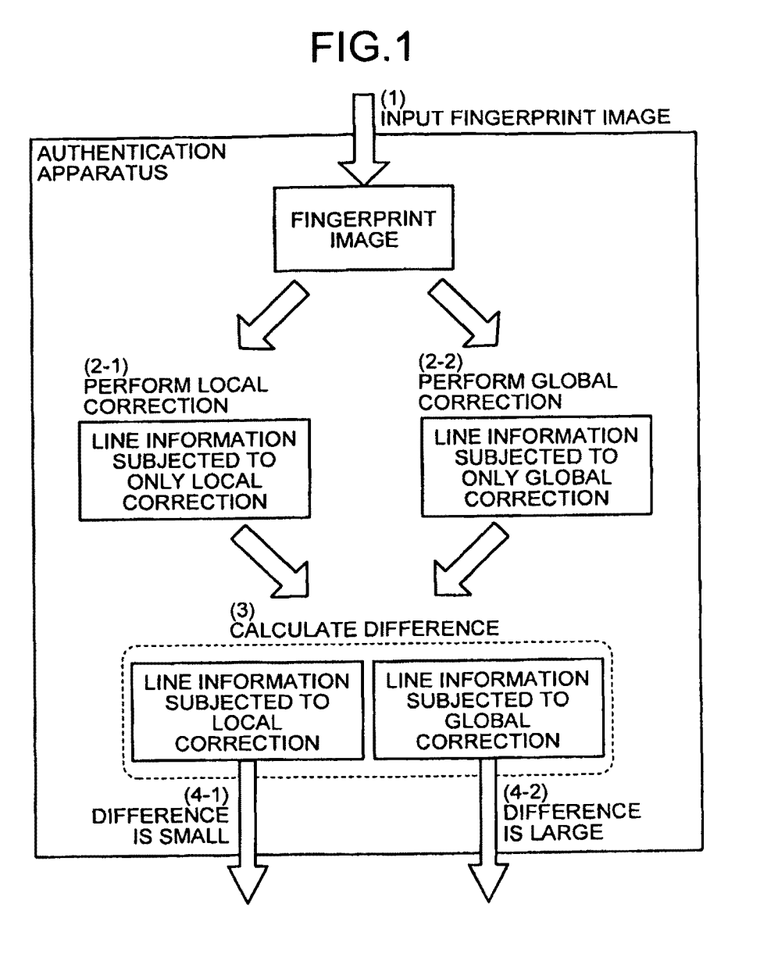
FIG. 1 is a schematic diagram illustrating the outline of an authentication apparatus according to a first embodiment.

First, the outline of an authentication apparatus according to a first embodiment will be described with reference to FIG.

1. FIG. 1 is a schematic diagram illustrating the outline of the authentication apparatus according to the first embodiment.

As illustrated in (1) of FIG. 1, the authentication apparatus according to the first embodiment receives a fingerprint image that is input from a user. Then, as illustrated in (2-1) of FIG. 1, the authentication apparatus performs local correction on the fingerprint image. For example, the authentication apparatus performs a correction using, for example, a smoothing filter.

Furthermore, as illustrated in (2-2) of FIG. 1, the authentication apparatus according to the first embodiment performs global correction on the fingerprint image. For example, the authentication apparatus performs correction by modeling using a formula in which it is assumed that the flow of line information is a phase diagram that is often used in physics.

Here, the authentication apparatus according to the first embodiment separately performs the local correction and the global correction. In other words, the authentication apparatus creates line information subjected to only the local correction and line information subjected to only the global correction.

Then, as illustrated in (3) of FIG. 1, the authentication apparatus according to the first embodiment calculates the difference between the line information subjected to only the local correction and the line information subjected to only the global correction.

Thereafter, the authentication apparatus according to the first embodiment compares the difference with a threshold. If the difference is smaller than the threshold, as illustrated in (4-1) of FIG. 1, the authentication apparatus selects, as line information contained in image data, the line information that is corrected by the local correction and outputs the line information. If the difference is greater than the threshold, as illustrated in (4-2) of FIG. 1, the authentication apparatus selects, as the line information contained in the image data, the line information that is corrected by the global correction and outputs the line information.

In this way, the authentication apparatus according to the first embodiment can select a correction method suitable for the image quality that is used for the authentication. Specifically, the authentication apparatus separately uses, for fingerprint images, the local correction in which detailed information is maintained and the global correction in which correction effectiveness is large. If the difference between the two corrected fingerprints is small, the former method is used, whereas if the difference is large, the latter method is used. Accordingly, the authentication apparatus performs correction that is suitable for the quality of the fingerprint.

Configuration of Authentication Apparatus According to First Embodiment

Figure 2:
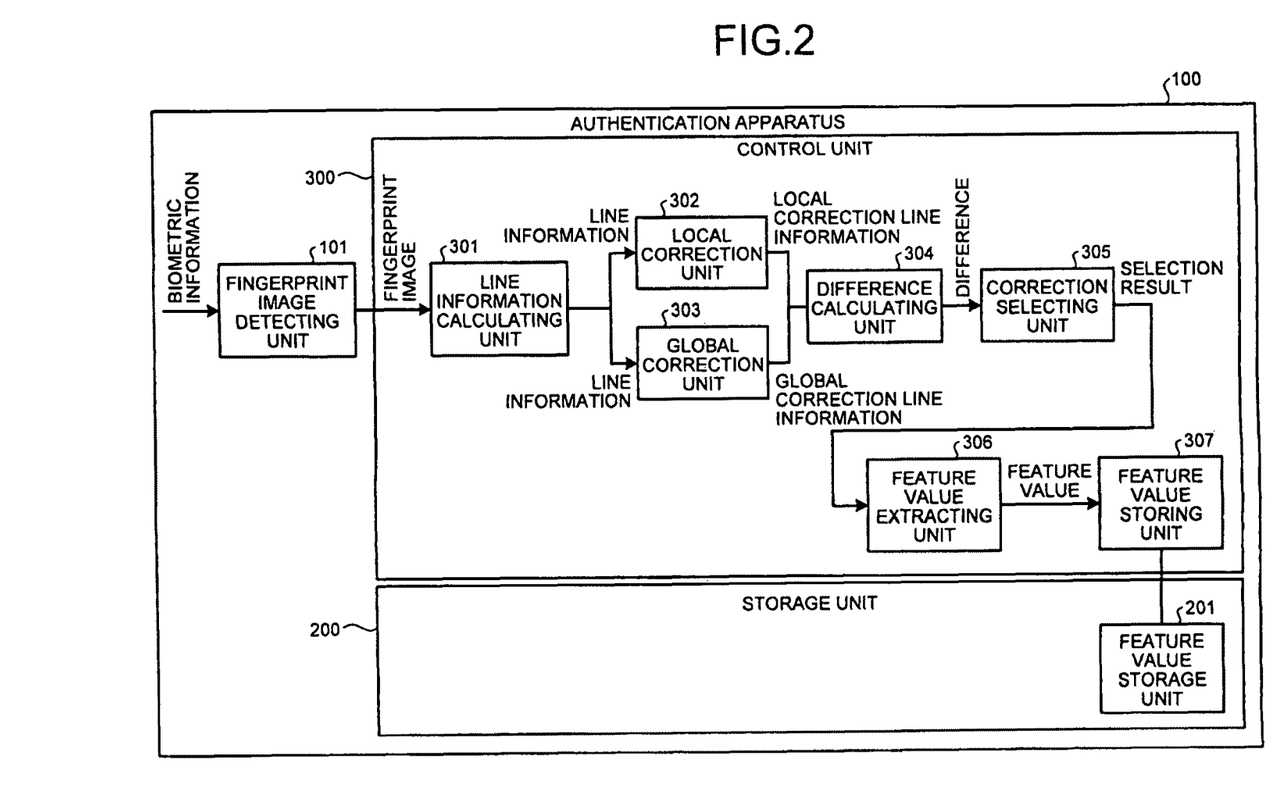
FIG. 2 is a block diagram illustrating the configuration of the authentication apparatus according to the first embodiment.

In the following, the configuration of the authentication apparatus 100 illustrated in FIG. 1 will be described with reference to FIG. 2. FIG. 2 is a block diagram illustrating the configuration of the authentication apparatus according to the first embodiment. As described in FIG. 2, the authentication apparatus 100 includes a fingerprint image detecting unit 101, a storage unit 200, and a control unit 300. In the first embodiment, a method of extracting a feature value from an image of user's fingerprint and inputting the feature value to the storage unit 200 as a feature value that is used at the time of authentication will be mainly described.

The fingerprint image detecting unit 101 is connected to a line information calculating unit 301, which will be described later. The fingerprint image detecting unit 101 visualizes biometric information on a user by intermittently detecting multiple partial images and detects a fingerprint image (also referred to as "image data") whose feature value extracted from the shape of a line is used for authentication.

Examples of the fingerprint image detecting unit 101 include a fingerprint sensor, which detects a fingerprint image of a user if a user's finger is pressed on it. Examples of the fingerprint sensor include a capacitance type fingerprint sensor, a thermal fingerprint sensor, an electric field fingerprint sensor, or an optical fingerprint sensor.

The fingerprint image detecting unit 101 sends the detected fingerprint image to the line information calculating unit 301.

The storage unit 200 stores therein data necessary for processing authentication performed by the control unit 300. The storage unit 200 includes a feature value storage unit 201 that is connected to a feature value storing unit 307, which will be described later. The feature value storage unit 201 stores therein a feature value that is used for authentication and is extracted from the shape of the line. The feature value mentioned here is information necessary for biometric authentication, and, if it is a fingerprint image, a branch point or an end point of a ridge corresponds to the feature value. The information stored in the feature value storage unit 201 is stored by the feature value storing unit 307, which will be described later.

The control unit 300 performs various correction processes. For example, if the control unit 300 receives a fingerprint image from the fingerprint image detecting unit 101, the control unit 300 extracts a feature value from a fingerprint image and inputs the feature value to the feature value storage unit 201. Furthermore, the control unit 300 includes the line information calculating unit 301, a local correction unit 302, a global correction unit 303, a difference calculating unit 304, a correction selecting unit 305, a feature value extracting unit 306, and the feature value storing unit 307.

The line information calculating unit 301 is connected to the fingerprint image detecting unit 101, the local correction unit 302, and the global correction unit 303. For the fingerprint image received from the fingerprint image detecting unit 101, the line information calculating unit 301 calculates line information (also referred to as a "ridge angle" or a "ridge direction") that indicates the shape of the line. Specifically, the line information calculating unit 301 calculates, for each region of the fingerprint image, line information that is information about the shape of the line contained in that region. For example, the line information is calculated as "30 degrees" or "50 degrees". The line information mentioned here is an angle indicated by the shape of the line contained in the region.

Figure 3:
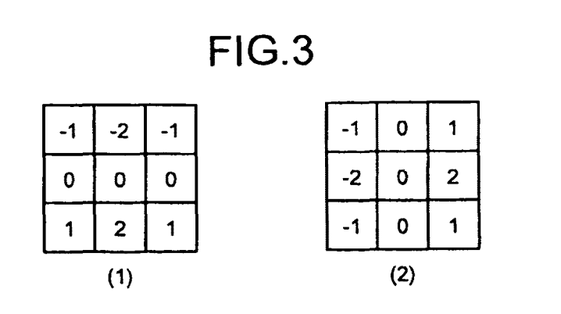
FIG. 3 is a schematic diagram illustrating an example of a sobel filter in the first embodiment.

For example, the line information calculating unit 301 divides the fingerprint image into a region of "w×w" in size and partially differentiate, using a sobel filter like that illustrated in FIG. 3, in the horizontal direction (x direction) and in the vertical direction (y direction) to obtain ∂x and ∂y. Then, the line information calculating unit 301 calculates, from ∂x and ∂y using Equation (1), local line information θ(i, j) with respect to a center pixel (i, j) in each block. The sobel filter is a filter that is used when a vertical line edge or a horizontal line edge is detected. FIG. 3 is a schematic diagram illustrating an example of the sobel filter in the first embodiment. A filter in the vertical direction is illustrated in (1) of FIG. 3. A filter in the horizontal direction is illustrated in (2) of FIG. 3.

$$V_x(i, j) = \sum_{u=i-\frac{w}{2}}^{i+\frac{w}{2}} \sum_{v=j-\frac{w}{2}}^{j+\frac{w}{2}} 2\partial_x(u, v)\partial_y(u, v) \tag{1}$$

$$\theta(i, j) = \frac{1}{2}\tan^{-1}\left(\frac{V_y(i, j)}{V_x(i, j)}\right)$$

$$V_y(i, j) = \sum_{u=i-\frac{w}{2}}^{i+\frac{w}{2}} \sum_{v=j-\frac{w}{2}}^{j+\frac{w}{2}} \partial_x^2(u, v)\partial_y^2(u, v)$$

In Equation (1), the direction in which the square error is minimum with respect to each pixel in the block is calculated using the gradient squared averaging method. In Equation (1), to make the equation easier to read, Vx and Vy are values of arctan parameters represented by the numerator and the denominator, respectively. Furthermore, the symbols "u" and "v" are variables that are repeatedly used in the formula.

Furthermore, the line information calculating unit 301 sends the line information calculated for each region to the local correction unit 302 and the global correction unit 303.

The local correction unit 302 is connected to the line information calculating unit 301 and the difference calculating unit 304. The local correction unit 302 receives, from the line information calculating unit 301, the line information calculated for each region and then performs the local correction on the line information calculated for each region of the fingerprint image. Furthermore, the local correction unit 302 sends, to the difference calculating unit 304, local correction line information that is the line information corrected using the local correction.

Figure 4:
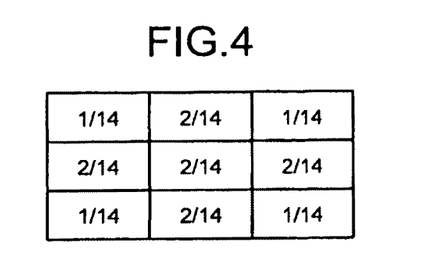
FIG. 4 is a schematic diagram illustrating an example of a smoothing filter in the first embodiment.

The local correction mentioned here is the correction performed, for each divided region of the fingerprint image, on the calculated line information on the divided region and the correction that is performed using the shape of the local line indicated by the line information contained in a neighboring region of the divided region. For example, the local correction corresponds to the correction using the smoothing filter illustrated in FIG. 4. FIG. 4 is a schematic diagram illustrating an example of the smoothing filter in the first embodiment.

Figure 5:
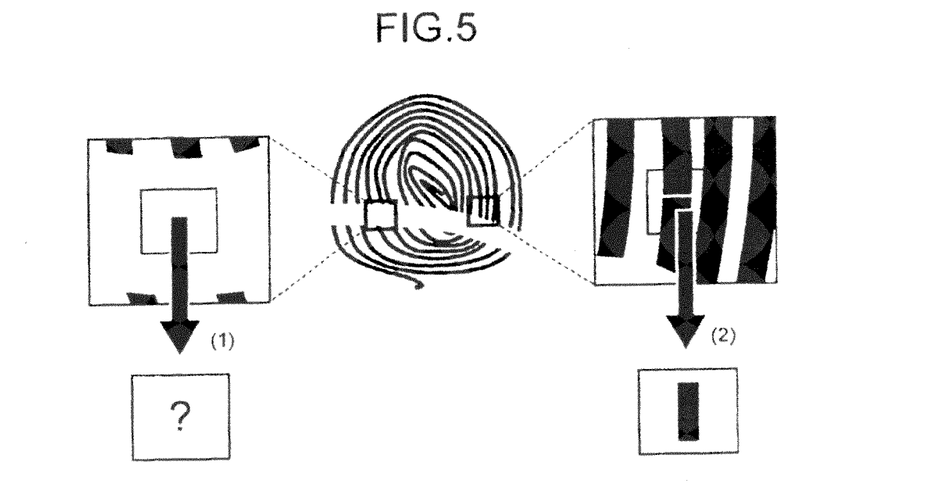
FIG. 5 is a schematic diagram illustrating local correction in the first embodiment.

Furthermore, the local correction maintains detailed information on the line information; however, for example, as illustrated in (1) of FIG. 5, if the fingerprint image contains noise larger than the size of the smoothing filter, the local correction cannot correct that noise. In the example illustrated in (1) of FIG. 5, as no line information is contained in a region of the smoothing filter, as illustrated in (1) of FIG. 5, noise cannot be corrected by the local correction.

In other words, with the local correction, as illustrated in (2) of FIG. 5, correction can be performed only when noise that is smaller than the size of the smoothing filter is present. FIG. 5 is a schematic diagram illustrating the local correction in the first embodiment. The detailed information corresponds to, for example, small changes of the line information.

The global correction unit 303 is connected to the line information calculating unit 301 and the difference calculating unit 304. The global correction unit 303 receives, from the line information calculating unit 301, the line information calculated for each region and performs the global correction on the line information calculated for each region of the fingerprint image. Furthermore, the global correction unit 303 sends, to the difference calculating unit 304, global correction line information that is the line information corrected using the global correction.

The global correction mentioned here is the correction performed, for the fingerprint image and with respect to the calculated line information on the divided region, using the shape of the global line indicated by the line information calculated for each region contained in a larger region than a neighboring region. For example, the global correction corresponds to the correction performed by modeling using a formula in which it is assumed that the shape of the line or the flow of line information is a phase diagram that is often used in physics. Furthermore, the global correction has a significant effect on correction compared with the local correction but lacks detailed information on the line information.

The difference calculating unit 304 is connected to the local correction unit 302, the global correction unit 303, and the correction selecting unit 305. The difference calculating unit 304 receives the correction line information from the local correction unit 302 or receives the global correction line information from the global correction unit 303. Then, the difference calculating unit 304 calculates the difference between the local correction line information and the global correction line information. For example, the difference calculating unit 304, first, converts both the local correction line information and the global correction line information to continuous vector fields and, then calculates, for each region, the difference between the local correction line information and the global correction line information. Then, the difference calculating unit 304 calculates a sum total difference that is the sum total value of the calculated differences. Furthermore, the difference calculating unit 304 sends the calculated sum total difference to the correction selecting unit 305.

Here, the significance of the conversion to the continuous vector field will be described in brief. For differences for each region, if pieces of line information on arbitrary regions are, for example, "30 degrees" and "50 degrees", the difference calculating unit 304 calculates the difference as "20 degrees". Here, when calculating the difference, the difference calculating unit 304 considers only an angle difference. Accordingly, for example, the difference calculating unit 304 treats "0 degrees" and "180 degrees" as the same degree of an angle and calculates the difference being "0 degrees". Converting to the continuous vector field is a process for treating, for example, "0 degrees" and "180 degrees" as the same value.

Figure 6:
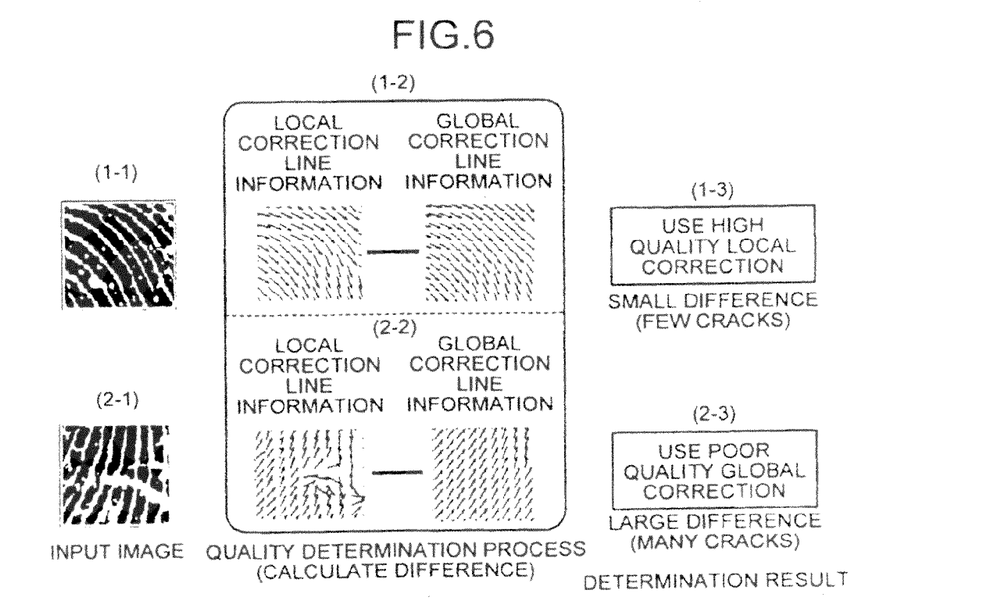
FIG. 6 is a schematic diagram illustrating a correction selecting unit in the first embodiment.

The correction selecting unit 305 is connected to the difference calculating unit 304 and the feature value extracting unit 306. The correction selecting unit 305 receives, from the difference calculating unit 304, the sum total difference and compares the sum total difference with a threshold. Then, as illustrated in FIG. 6, if the difference is less than the threshold, the correction selecting unit 305 selects, as the line information contained in the fingerprint image, the local correction line information and outputs it to the feature value extracting unit 306. If the difference is greater than the threshold, the correction selecting unit 305 selects, as the line information contained in the fingerprint image, the global correction line information and outputs it to the feature value extracting unit 306. FIG. 6 is a schematic diagram illustrating the correction selecting unit in the first embodiment.

Specifically, if the difference between the local correction line information and the global correction line information is small, the correction selecting unit 305 selects the local correction line information that is the line information subjected to the local correction in which detailed information on the line information is maintained. In contrast, if the difference between the local correction line information and the global correction line information is large, the correction selecting unit 305 selects the global correction line information that is the line information subjected to the global correction having the large correction effect.

A case in which the difference between the local correction line information and the global correction line information is large is a case in which, for example, the fingerprint image contains noise larger than the smoothing filter and such a large amount of noise Can be corrected only by the global correction but cannot be corrected by the local correction. As illustrated in (2-1) of FIG. 6, if the fingerprint image detecting unit 101 detects a fingerprint image containing a large amount of noise, as 44 can be displayed either simultaneously or sequentially on a display device. Moreover, the display contents can be selected in response to a display switching operation performed by the user regarding the displays 41 to 44.

More particularly, in the display 43, the configuration items included in the inconsistent logical formulae is displayed in an identifiable manner from the other configuration items. The display 44 includes the prospective configuration information that can resolve the inconsistency in the logical formulae. More particularly, in the display 44, the locations at which modifications have been made are displayed in an identifiable manner from the current configuration information. When there exists more than one set of the prospective configuration information that can resolve the inconsistency in the logical formulae, it is desirable to make each set of the prospective configuration information viewable.

Figure 8:
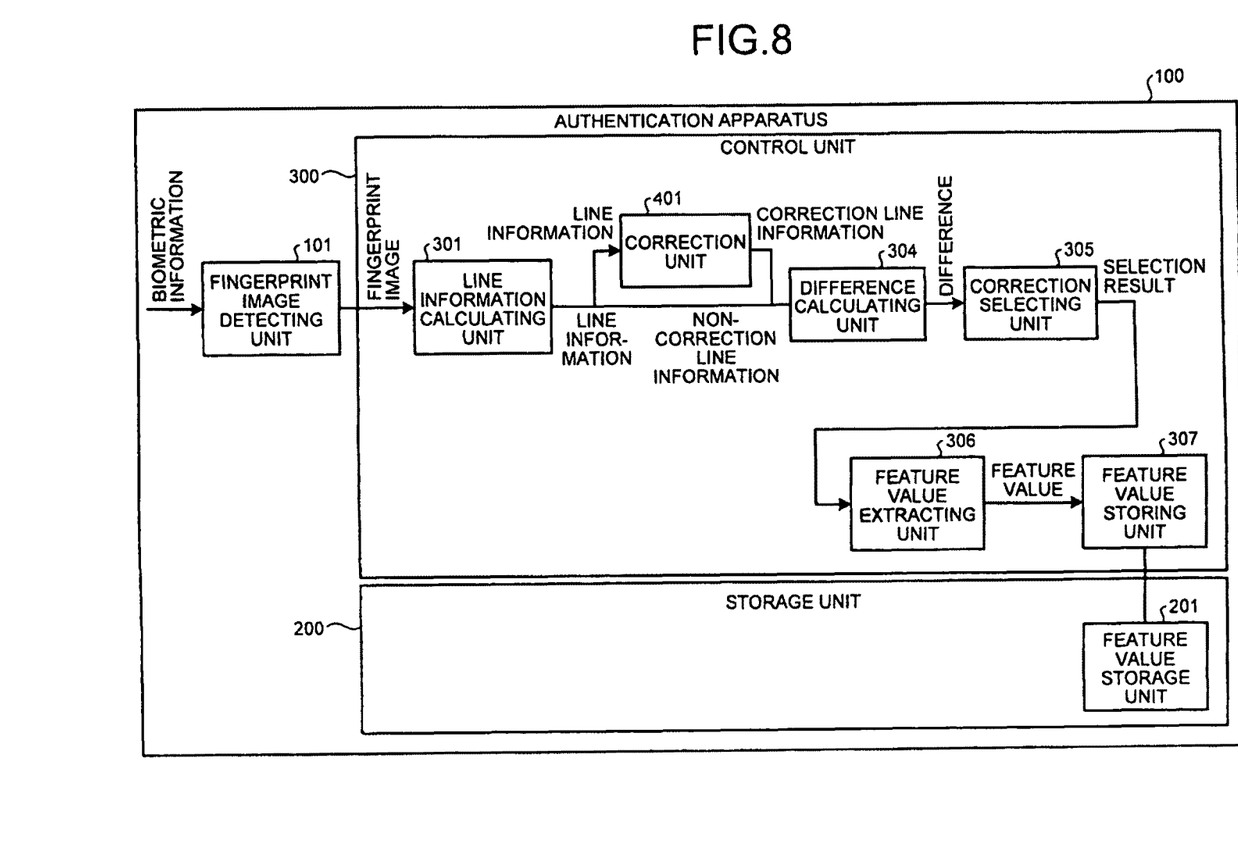
FIG. 8 is a block diagram illustrating the configuration of an authentication apparatus according to a second embodiment.

FIG. 8 is a flowchart for explaining the sequence of operations performed by the alive monitoring information collecting unit 21. Upon being instructed by the logical formula creating unit 22 or by the logical formula inconsistency resolving unit 24 to collect the alive monitoring information, the alive monitoring information collecting unit 21 starts the operations illustrated in FIG. 8.

Upon being instructed by the logical formula creating unit 22 to collect the alive monitoring information, the alive monitoring information collecting unit 21 first obtains a collection range A of the alive monitoring information (Step S301). Herein, the collection range A is set in advance in accordance with the range of the configuration information.

Subsequently, regarding alive monitoring information D that is collection result, the alive monitoring information collecting unit 21 initializes the alive monitoring information D to empty (Step S302). Then, the alive monitoring information collecting unit 21 determines whether the collection range A is empty (Step S303). If the collection range A is not empty (No at Step S303), the alive monitoring information collecting unit 21 retrieves a single internet protocol (IP) address "a" from the collection range A (Step S304). Subsequently, the alive monitoring information collecting unit 21 issues a ping command to the IP address "a" for obtaining an alive monitoring result "d" of the IP address "a" (Step S305), and adds (a, d) in the alive monitoring information D (Step S306). Then, the system control returns to Step S303. When the collection range A becomes empty (Yes at Step S303), the alive monitoring information collecting unit 21 sends as response the alive monitoring information D, which is the collection result, to the logical formula creating unit 22 or to the logical formula inconsistency resolving unit 24 (Step S307) and ends the operations.

Figure 9:
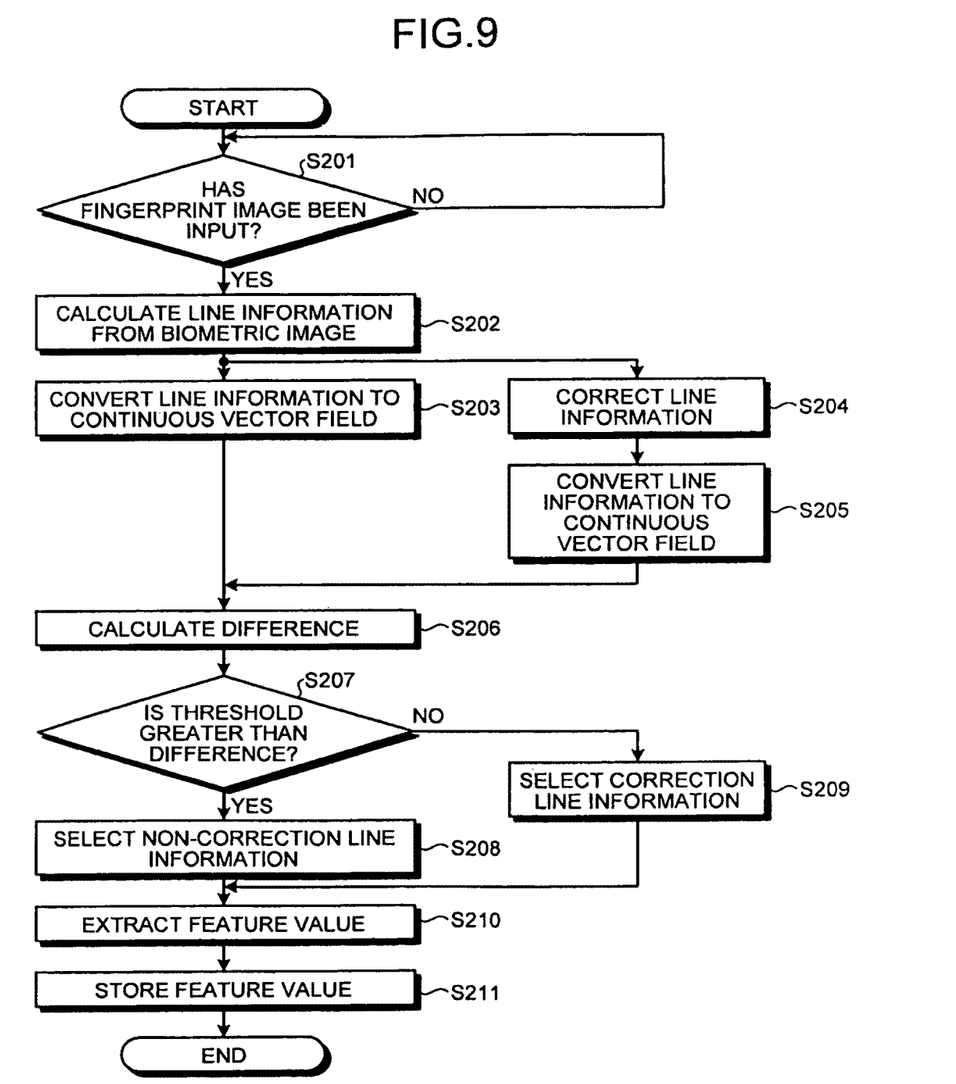
FIG. 9 is a flowchart illustrating the flow of the process performed by the authentication apparatus in the second embodiment.

FIG. 9 is an explanatory diagram for explaining a specific example of the operations performed by the alive monitoring information collecting unit 21. As illustrated in FIG. 9, the collection range A includes the IP addresses from which the alive monitoring information is to be collected. Regarding the IP addresses, it is not only possible to individually specify IP addresses such as "10.10.10.1" and "10.10.10.127", but also possible to specify IP address ranges such as "20.20.20.1-127" and "30.30.30.*".

In the alive monitoring information D obtained as the collection result, each IP address included in the collection range A is held in a corresponding manner with the alive monitoring result of either "alive" or "dead". The alive monitoring result of "alive" for a particular IP address indicates confirmation of the fact that there has been a response from that particular IP address and the corresponding device is operating normally. In contrast, the alive monitoring result of "dead" for a particular IP address indicates that no confirmation is obtained regarding the fact that there has been a response from that particular IP address and the corresponding device is operating normally.

Figure 10:
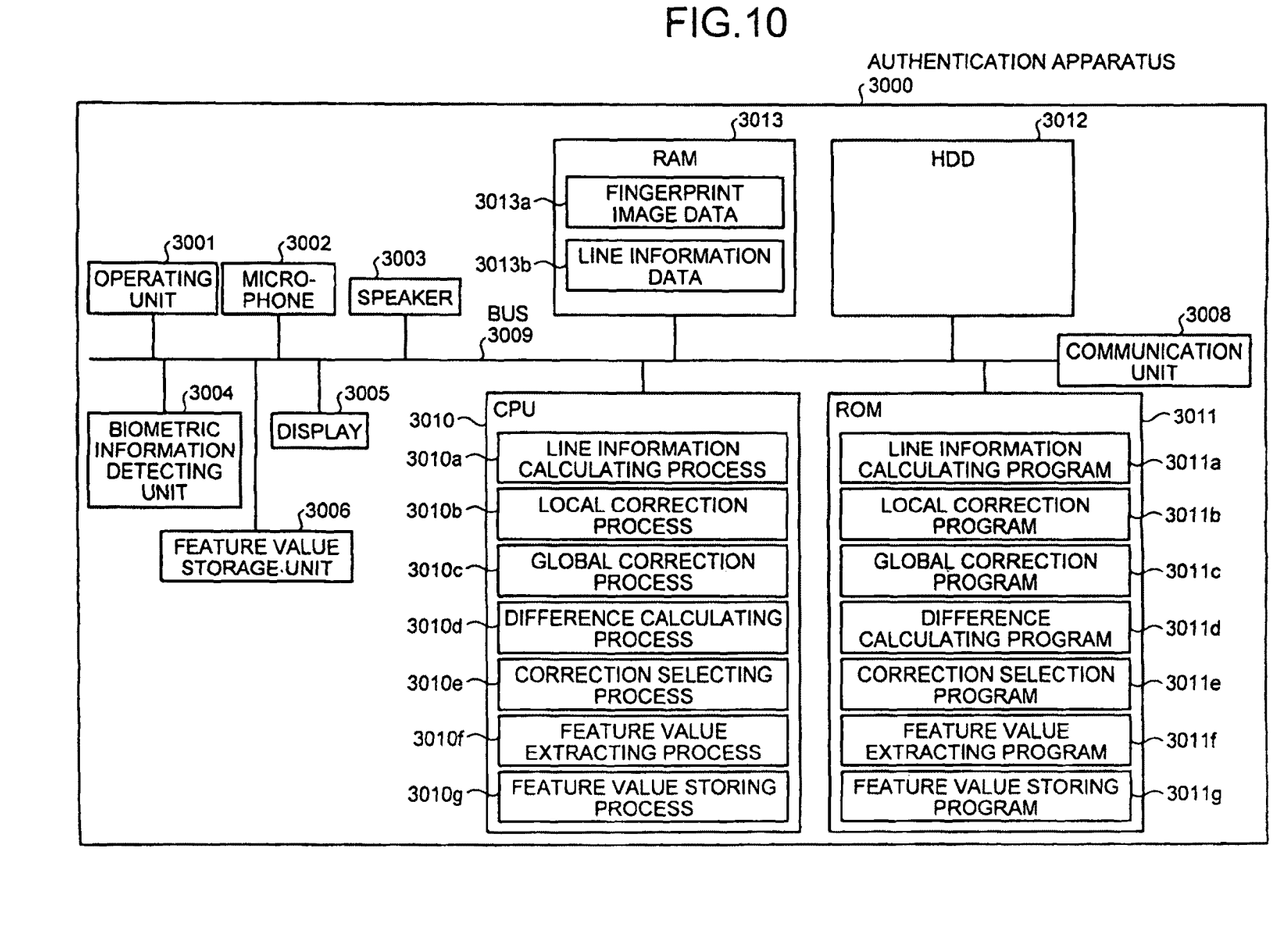
FIG. 10 is a schematic diagram illustrating a program of the authentication apparatus according to the first embodiment.

FIG. 10 is a flowchart for explaining the sequence of operations performed by the logical formula creating unit 22. Upon being instructed by the control unit 20 to create the logical formula set L, the logical formula creating unit 22 starts the operations illustrated in FIG. 10.

Firstly, the logical formula creating unit 22 initializes the logical formula set L to empty (Step S401) and, as configuration information C, obtains the configuration information 33 from the CMDB 32 (Step S402). Then, the logical formula creating unit 22 instructs the alive monitoring information collecting unit 21 to collect the alive monitoring information D (Step S403).

Upon obtaining the alive monitoring information D from the alive monitoring information collecting unit 21, the logical formula creating unit 22 determines whether the alive monitoring information D is empty (Step S404). If the alive monitoring information D is not empty (No at Step S404), then the logical formula creating unit 22 retrieves a single combination (a, d) of the IP address "a" and the corresponding alive monitoring result from the alive monitoring information D (Step S405).

Subsequently, the logical formula creating unit 22 refers to the configuration information C and calculates a route set P regarding the IP address "a." (Step S406). If the route set P is not empty (No at Step S407), then the logical formula creating unit 22 creates a logical formula "1" corresponding to the route set P (Step S408) and adds the logical formula "1" in the logical formula set L (Step S409).

After Step S409 is performed, if the route set P is empty (Yes at Step S407), then the system control returns to Step S404. When the alive monitoring information D becomes empty (Yes at Step S404), the logical formula creating unit 22 sends as response the created logical formula set L to the control unit 20 (Step S410) and ends the operations.

FIG. 11 is a flowchart for explaining in'detail the operation of creating the logical formula "1" corresponding to the route set P that is performed at Step S408 in FIG. 10. When the alive monitoring result "d" indicates "alive" (Yes at Step S501), the logical formula creating unit 22 sets "r=true" and sets "e=false" (Step S502). On the other hand, when the alive monitoring result "d" indicates "dead" (No at Step S501), the logical formula creating unit 22 sets "r=false" and sets "e=false" (Step S503).

Subsequently, the logical formula creating unit 22 retrieves a single route "p" from the route set P (Step S504). Then, the logical formula creating unit 22 creates an AND formula "e'" in which all resources, that is, all configuration items included in the route P are taken as elements (Step S505). Subsequently, the logical formula creating unit 22 sets "e=e OR e'" (Step S506).

Then, the logical formula creating unit 22 determines whether the route set P is empty (Step S507). If the route set P is not empty (No at Step S507), then the system control returns to Step S504. When the route set P becomes empty (Yes at Step S507), the logical formula creating unit 22 sets "(e=r)" as the logical formula "1" (Step S508) and ends the operation of creating the logical formula "1".

FIG. 12 is an explanatory diagram for explaining a specific example of logical formula creation. In the example illustrated in FIG. 12, in the configuration information C, the gateways GW1 and GW2 are connected to the gateway GW0; the machines mA and mB are connected to the gateway GW1; and the machines mC and mD are connected to the gateway GW2.

Moreover, in the example illustrated in FIG. 12, "alive" is assigned as the alive monitoring result of the gateway GW0, the gateway GW2, the machine mA, and the machine mB; while "dead" is assigned as the alive monitoring result of the gateway GW1, the machine mC, and the machine mD.

Thus, in the example illustrated in FIG. 12, following logical formulae are obtained.

GW0=true

GW0 AND GW1=false

GW0 AND GW2=true

GW0 AND GW1 AND machine mA=true

GW0 AND GW1 AND machine mB=true

GW0 AND GW2 AND machine mC=false

GW0 AND GW2 AND machine mD=false

FIG. 13 is an explanatory diagram for explaining logical formula creation regarding a configuration item that can be reached via a plurality of routes. In the example illustrated in FIG. 13, as the routes leading to the machine mA, the route set P is obtained that includes two routes, namely, the route (GW0, GW1, machine mA) and the route (GW0, GW2, machine mA).

From this route set P, "e" of the logical formula is obtained as follows:
"false OR (GW0 AND GW1 AND machine mA) OR (GW0 AND GW2 AND machine mA)".
Besides, since the alive monitoring result of the machine mA indicates "alive", the logical formula "1" of the machine mA is obtained as follows:
"false OR (GW0 AND GW1 AND machine mA) OR (GW0 AND GW2 AND machine mA)=true".

FIG. 14 is a flowchart for explaining the sequence of operations performed by the logical formula verifying unit 23. Upon being instructed by the control unit 20 to verify the logical formula set L, the logical formula verifying unit 23 starts the operations illustrated in FIG. 14.

Firstly, the logical formula verifying unit 23 initializes a logical formula set R to empty (Step S601), initializes a valid formula set T to empty (Step S602), and initializes an inconsistent formula set F to empty (Step S603). Subsequently, the logical formula verifying unit 23 determines whether the logical formula set L is empty (Step S604). If the logical formula set L is not empty (No at Step S604), then the logical formula verifying unit 23 sets a logical formula set L1 equal to the logical formula set L (Step S605) and sets a logical formula set L2 equal to the logical formula set L1 (Step S606).

Subsequently, the logical formula verifying unit 23 initializes the logical formula set R to empty (Step S607) and determines whether the logical formula set L2 is empty (Step S608). If the logical formula set L2 is not empty (No at Step S608), then the logical formula verifying unit 23 performs a logical formula cracking operation (Step S609). After Step S609 is performed or if the logical formula set L2 is empty (Yes at Step S608), the logical formula verifying unit 23 updates the logical formula set R by substituting therein the result of the valid formula set T and the result of the inconsistent formula set F (Step S610).

Subsequently, the logical formula verifying unit 23 determines whether the logical formula set L1 and the logical formula R are identical (Step S611). If the logical formula set L1 and the logical formula R are not identical (No at Step S611), then the logical formula verifying unit 23 sets the logical formula set L1 equal to the logical formula set R (Step S612) and the system control returns to Step S606.

On the other hand, if the logical formula set L1 and the logical formula R are identical (Yes at Step S611) or if the logical formula set L is empty (Yes at Step S604), then the logical formula verifying unit 23 sends as response the logical formula set R, the valid formula set T, and the inconsistent formula set F to the control unit 20 (Step S613) and ends the operations.

FIG. 15 is a flowchart for explaining the logical formula cracking operation performed at Step S609 illustrated in FIG. 14. Firstly, the logical formula verifying unit 23 retrieves a single logical formula "1" from the logical formula set L2 (Step S701) and determines whether the logical formula "1" is of the sum-of-product form and has the "false" value (Step S702).

If the logical formula "1" is of the sum-of-product form and has the "false" value (Yes at Step S702); then, regarding each product term in the logical formula "1", the logical formula verifying unit 23 creates a logical formula "product term=false" and adds it to the logical formula set R (Step S703).

On the other hand, if the logical formula "1" is not of the sum-of-product form or if logical formula "1" has the "true" value (No at Step S702), then the logical formula verifying unit 23 determines whether the logical formula "1" is of the sum form and has the "false" value (Step S704).

If the logical formula "1" is of the sum form and has the "false" value (Yes at Step S704); then, regarding each term in the logical formula "1", the logical formula verifying unit 23 creates a logical formula "term=false" and adds it to the inconsistent formula set F (Step S705).

In contrast, if the logical formula "1" is not of the sum form or if the logical formula "1" has the "true" value (No at Step S704), then the logical formula verifying unit 23 determines whether the logical formula "1" is of the product form and has the "true" value (Step S706).

If the logical formula "1" is of the product form and has the "true" value (Yes at Step S706); then, regarding each term in the logical formula "1", the logical formula verifying unit 23 creates a logical formula "term=true" and adds it to the valid formula set T (Step S707).

In contrast, if the logical formula "1" is not of the product form or if the logical formula "1" has the "false" value (No at Step S706); then the logical formula verifying unit 23 ends the logical formula cracking operation. Besides, upon performing any one of Steps S703, S705, and S707; the logical formula verifying unit 23 ends the logical formula cracking operation.

FIG. 16 is an explanatory diagram for explaining a specific example of the operations performed by the logical formula verifying unit 23. When the logical formula set L created by the logical formula creating unit 22 includes the following logical formulae:

GW0=true

GW0 AND GW1=false

GW0 AND GW2=true

GW0 AND GW1 AND machine mA=true

GW0 AND GW1 AND machine mB=true

GW0 AND GW2 AND machine mC=false

GW0 AND GW2 AND machine mD=false, the logical formula verifying unit 23 creates the logical illustrated in (2-2) of FIG. 6, the local noise cannot be corrected by the correction line information, whereas the correction effect can be recognized in the global correction line information. As a result, because the difference between the local correction line information and the global correction line information is large, the correction selecting unit 305 selects the global correction line information as illustrated in (2-3) of FIG. 6. In other words, if a lot of cracks are present, the correction selecting unit 305 uses poor quality global correction. The poor quality mentioned here is the quality that cannot maintain detailed information when compared with the local correction.

Furthermore, a case in which the difference between the local correction line information and the global correction line information is small is a case in which, for example, the fingerprint image does not contain noise larger than the smoothing filter and thus noise in the fingerprint image can be corrected by either one of the local correction and the global correction. As illustrated in (1-1) of FIG. 6, if the fingerprint image detecting unit 101 detects a fingerprint image that does not contain a large amount of noise, as illustrated in (1-2) of FIG. 6, the difference between the local correction line information and the global correction line information is small. Here, with the global correction line information, because small changes of the line information are not grasped due to a lack of detailed information, as illustrated in (1-3) of FIG. 6, the correction selecting unit 305 selects the local correction line information so as to hold the detailed information. In other words, if a small amount of cracks are present, the correction selecting unit 305 uses high quality local correction.

The threshold used by the correction selecting unit 305 is set by, for example, a user.

The feature value extracting unit 306 is connected to the correction selecting unit 305 and the feature value storing unit 307. The feature value extracting unit 306 receives, from the correction selecting unit 305, the local correction line information image of the global correction line information and extracts a feature value from the received line information. Then, the feature value extracting unit 306 sends the extracted feature value to the feature value storing unit 307.

The feature value storing unit 307 is connected to the feature value extracting unit 306 and the feature value storage unit 201. The feature value storing unit 307 receives the feature value from the feature value extracting unit 306 and inputs the received feature value to the feature value storage unit 201. For example, when the feature value storing unit 307 inputs the feature value, the feature value storing unit 307 stores the feature value in the feature value storage unit 201 after encrypting the feature value.

Process performed by authentication apparatus according to First Embodiment

Figure 7:
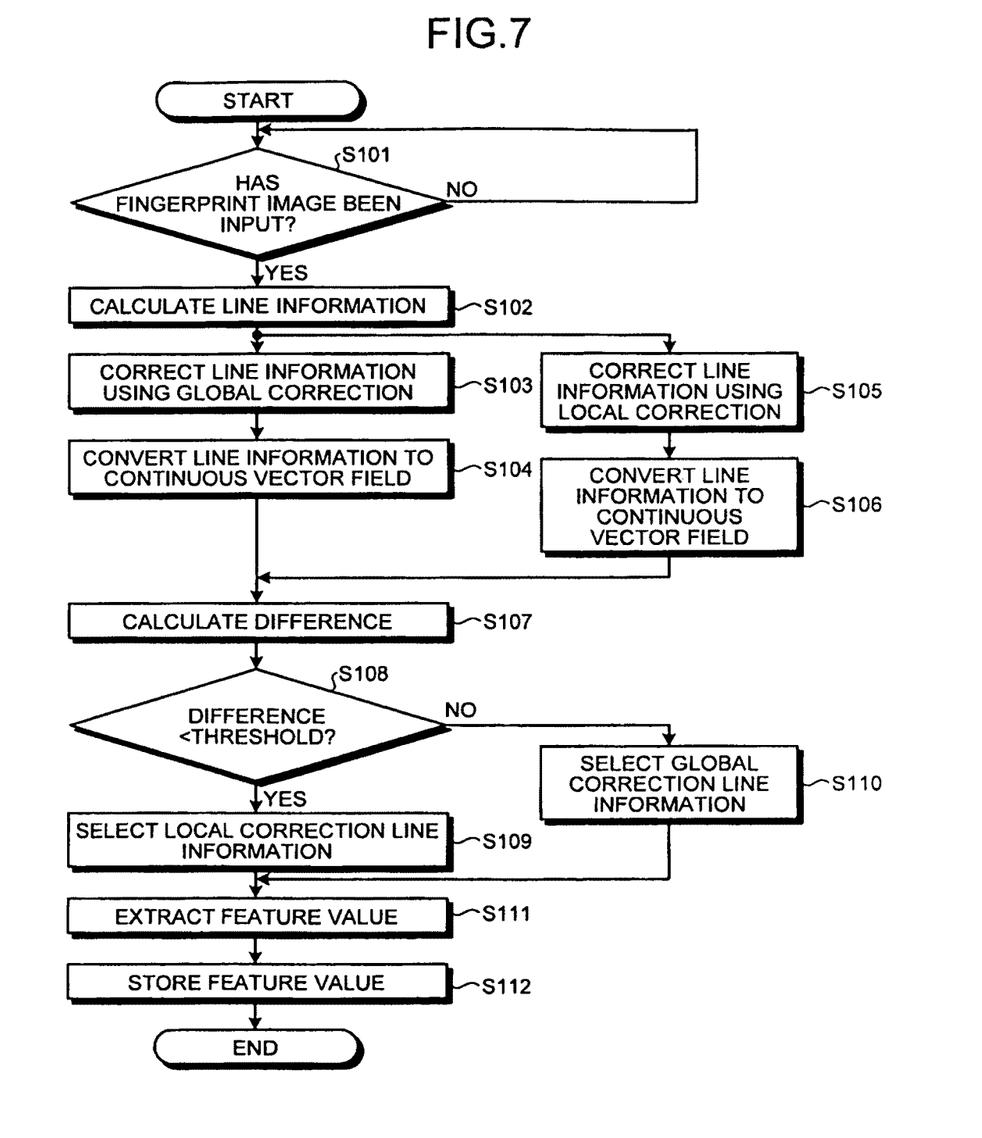
FIG. 7 is a flowchart illustrating the flow of the process performed by the authentication apparatus in the first embodiment.

In the following, the flow of the process performed by the authentication apparatus 100 according to the first embodiment will be described with reference to FIG. 7. FIG. 7 is a flowchart illustrating the flow of the process performed by the authentication apparatus in the first embodiment.

If a fingerprint image has been input (Yes at Step S101), the line information calculating unit 301 calculates, as a ridge angle of "30 degrees" or "50 degrees", line information for each region of the fingerprint image received from the fingerprint image detecting unit 101 (Step S102).

The global correction unit 303 performs correction on each piece of line information using the global correction (Step S103). Then, the difference calculating unit 304 converts, to a continuous vector field, the global correction line information that is the line information corrected by the global correction unit 303 (Step S104).

The local correction unit 302 performs correction on each piece of line information using the local correction (Step S105). In other words, the local correction unit 302 performs the local correction on the line information calculated for each region of the fingerprint image. Then, the difference calculating unit 304 converts, to a continuous vector field, the local correction line information that is the line information corrected by the local correction unit 302 (Step S106).

Then, the difference calculating unit 304 calculates the difference between the local correction line information and the global correction line information (Step S107). The correction selecting unit 305 compares the sum total difference with the threshold (Step S108). At this time, if the threshold is greater than the sum total difference (Yes at Step S108), the correction selecting unit 305 selects the local correction line information (Step S109). In contrast, if the threshold is not greater than the sum total difference (No at Step S108), the correction selecting unit 305 selects the global correction line information (Step S110).

Specifically, if the difference between the local correction line information and the global correction line information is small, the correction selecting unit 305 selects the local correction line information that is the line information subjected to the local correction that maintains the detailed information on the line information. In contrast, if the difference between the local correction line information and the global correction line information is large, the correction selecting unit 305 selects the global correction line information that is the line information subjected to the global correction that has a large correction effect.

Then, the feature value extracting unit 306 extracts the feature value from the line information that is received from the correction selecting unit 305 (Step S111). The feature value storing unit 307 stores the feature value in the feature value storage unit 201 (Step S112).

Advantage of First Embodiment

As described above, according to the first embodiment, the local correction and the global correction are separately performed on the fingerprint image, and the difference between the local correction line information and the global correction line information is calculated. Then, the difference is compared with the threshold. If the difference is less than the threshold, the local correction line information is output, whereas if the difference is greater than the threshold, the global correction line information is output. Accordingly, it is possible to select a correction method suitable for the quality of the image that is used for authentication.

Furthermore, with the conventional technology, there is a trade off between a "noise removal effect" and "maintaining the detailed information". Specifically, with the conventional correction method, detailed information cannot be maintained depending on a fingerprint image and there may be a case in which line information is erroneously checked with a fingerprint of a different person that is similar to the fingerprint to be checked, and there may also be a case in which an effect such as cracks due to noise cannot be removed. However, according to the first embodiment, it is possible to select a correction method suitable for the quality of the image that is used for authentication. This makes it possible to perform a correction suitable for the quality of the fingerprint.

[b] Second Embodiment

In the above explanation, it has been mentioned that the local correction or the global correction is selected, in accordance with the purpose as the correction method of the first embodiment; however, the present invention is not limited thereto. It is also possible to select, in accordance with the purpose as the correction method, whether a correction is performed or not.

Therefore, in the following, a method of selecting, in accordance with the purpose as the correction method of a second embodiment, whether a correction is performed or not will be described. In the following, components that are identical to those of the authentication apparatus in the first embodiment are either briefly described or descriptions thereof are omitted.

Configuration of Authentication Apparatus According to Second Embodiment

The authentication apparatus 100 according to the second embodiment will be described with reference to FIG. 8. FIG. 8 is a block diagram illustrating the configuration of the authentication apparatus according to the second embodiment.

As illustrated in FIG. 8, in the second embodiment, the line information calculating unit 301 is connected to a correction unit 401 and the difference calculating unit 304. The line information calculating unit 301 sends line information that is calculated for each region to the correction unit 401 and the difference calculating unit 304.

In the second embodiment, the correction unit 401 receives, from the line information calculating unit 301, the line information calculated for each region and performs the correction on the line information calculated for each region. Here, the correction unit 401 uses, as the correction method, for example, the local correction or the global correction. Furthermore, the correction unit 401 sends, to the difference calculating unit 304, the correction line information that is the corrected line information.

In the second embodiment, the difference calculating unit 304 receives the correction line information from the correction unit 401 and receives, from the line information calculating unit 301, non-correction line information that is the line information to which no correction is subjected. Then, the difference calculating unit 304 calculates the difference between the correction line information and the non-correction line information and calculates the sum total difference.

In the second embodiment, the correction selecting unit 305 compares the sum total difference calculated by the difference calculating unit 304 with the threshold. Then, if the difference is less than the threshold, the correction selecting unit 305 selects, as the line information contained in the fingerprint image, the non-correction line information and outputs it. In contrast, if the difference is greater than the threshold, the correction selecting unit 305 selects, as the line information contained in the fingerprint image, the correction line information and outputs it.

Specifically, if the difference between the correction line information and the non-correction line information is small, the correction selecting unit 305 outputs, to the feature value extracting unit 306, non-correction line information that is the line information which is subjected to no correction. If the difference between the correction image and the non-correction image is large, the correction selecting unit 305 outputs, to the feature value extracting unit 306, the correction line information that is the line information subjected to the correction.

Specifically, a case in which the difference between the correction line information and the non-correction line information is small is a case in which, for example, the quality of the fingerprint image detected by the fingerprint image detecting unit 101 is high and the correction process is thus not required. In such a case, the correction selecting unit 305 outputs, without performing correction, the non-correction line information which is subjected to no correction.

In other words, by performing the correction, a change is made to the fingerprint image that is detected by the fingerprint image detecting unit 101. A case in which the difference between the correction line information and the non-correction line information is small is a case in which the quality of the detected fingerprint image is high. Thus, the fingerprint image is output without processing it, i.e., without making a change by the correction.

Process Performed by Authentication Apparatus According to Second Embodiment

In the following, the flow of the process performed by the authentication apparatus 100 according to the second embodiment will be described with reference to FIG. 9. FIG. 9 is a flowchart illustrating the flow of the process performed by the authentication apparatus in the second embodiment.

In the second embodiment, if the fingerprint image has been input and the line information is calculated (Yes at Step S201 and Step S202), the difference calculating unit 304 converts the non-correction line information to a continuous vector field (Step S203).

The correction unit 401 performs the correction on the line information calculated for each region of the fingerprint image (Step S204). Then, the difference calculating unit 304 converts, to the continuous vector field, the correction line information that is the line information corrected by the correction unit 401 (Step S205).

Then, the difference calculating unit 304 calculates the difference between the non-correction line information and the correction line information (Step S206). The correction selecting unit 305 compares the sum total difference with the threshold (Step S207). If the threshold is greater than the sum total difference (Yes at Step S207), the correction selecting unit 305 selects the non-correction line information (Step S208). In contrast, if the threshold is not greater than the sum total difference (No at Step S207), the correction selecting unit 305 selects the correction line information (Step S209).

Steps S201 and S202 in FIG. 9 correspond to Steps S101 and S102 in FIG. 7. Furthermore, Steps S210 and S211 in FIG. 9 correspond to Steps S111 and S112 in FIG. 7.

Advantage of Second Embodiment

As described above, according to the second embodiment, the difference between the non-correction line information and the correction line information is calculated, and the difference is compared with the threshold. Then, if the difference is less than the threshold, non-correction line information is selected. If the difference is greater than the threshold, the correction line information is selected. In other words, if the quality of the fingerprint image is high, no correction is selected as the correction method. If the quality of the fingerprint image is low, correction is selected as the correction method. Accordingly, it is possible to select the correction suitable for the quality of the image that is used for authentication.

For example, if the quality of the fingerprint image detected by the fingerprint image detecting unit 101 is high enough not to require the correction, the correction image to which no correction is subjected is output without performing the correction.

[c] Third Embodiment

In the above explanation, embodiments of the present invention have been described; however, the present invention can be implemented as another embodiment other than the embodiments described above. Accordingly, in the following, another embodiment will be described.

Fingerprint Image

For example, in the first and second embodiments, the method of processing the fingerprint image has been described; however, the present invention is not limited thereto. For example, the process can be performed on biometric information, such as palm prints, finger veins, palm veins, and vascular patterns. Furthermore, the present invention can be used for information other than the biometric information as long as characteristic line information that is used for authentication is contained. For example, the present invention can be used for a process for authenticating banknotes.

Authentication

In the first embodiment, the method of inputting the feature value into the feature value storage unit 201 has been described; however, the present invention is not limited thereto. The authentication process can be performed using the extracted feature value. For example, it is possible to check the feature value obtained from the feature value extracting unit 306 with the feature value stored, in advance, in the feature value storage unit 201 and to output the result of the checking. When performing the checking process of the feature values, for example, it is possible to use a checking method in which a keyword (e.g., an ID) associated with the feature value is specified (one to one checking) or a checking method in which checking is performed without specifying an ID (one to many checking).

Detection of Fingerprint Images

Furthermore, in the first and second embodiments, the method performed on the fingerprint image detected by the fingerprint image detecting unit 101 has been described; however, the present invention is not limited thereto. It is also possible to perform a method on the fingerprint image stored in the storage unit in advance.

Combination of the Embodiments

In the first embodiment, the method of selecting, in accordance with the purpose, the local correction or the global correction has been described. In the second embodiment, the method of selecting, in accordance with the purpose, whether a correction is to be performed or not has been described. However, the present invention is not limited thereto. For example, when it is determined whether a correction is to be performed or not and if it is determined to be corrected, the local correction or the global correction can then be selected in accordance with the purpose. Furthermore, for example, it is also possible to select, in accordance with the purpose, the correction methods (i.e., the local correction, the global correction, and non-correction) by comparing the non-correction line information with the line information that is obtained by selecting, in accordance with the purpose, the local correction or the global correction.

System Configuration

Of the processes described in the embodiments, the whole or a part of the processes that are mentioned as being automatically performed can be manually performed. For example, the process for selecting the correction method can be manually performed by a user. Furthermore, the flow of the processes, the control procedures, the specific names, and the information containing various kinds of data or parameters indicated in the above specification and drawings (e.g., FIGS. 1 to 9) can be arbitrarily changed unless otherwise noted.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. For example, in the example illustrated in FIG. 2, the feature value storage unit 201 and the fingerprint image detecting unit 101 can be physically separated or the local correction unit 302 and the global correction unit 303 can be integrated.

Computer

Various kinds of processing described in the embodiments can be implemented by executing programs written in advance for a computer such as a personal computer or a workstation. Accordingly, in the following, a computer that executes an authentication program having the same function as those described in the embodiments described above will be described as an example with reference to FIG. 10. FIG. 10 is a schematic diagram illustrating a program of the authentication apparatus according to the first embodiment.

As illustrated in FIG. 10, an authentication apparatus 3000 according to the first embodiment includes an operating unit 3001, a microphone 3002, a speaker 3003, a biometric information detecting device 3004 (e.g., the fingerprint image detecting unit described above), a display 3005, a feature value storage unit 3006, communication unit 3008, a CPU 3010, a ROM 3011, an HDD 3012, a RAM 3013, which are all connected via a bus 3009.

The ROM 3011 stores therein, in advance, a control program having the same function as the line information calculating unit 301, the local correction unit 302, the global correction unit 303, the difference calculating unit 304, the correction selecting unit 305, the feature value extracting unit 306, and the feature value storing unit 307 described in the first embodiment. In other words, as illustrated in FIG. 10, the ROM 3011 stores therein, in advance, a line information calculating program 3011a, a local correction program 3011b, a global correction program 3011c, a difference calculating program 3011d, a correction selection program 3011e, a feature value extracting program 3011f, and a feature value storing program 3011g. These programs 3011a to 3011g can appropriately be integrated or separated in the same manner as the components of the authentication apparatus illustrated in FIG. 2.

As illustrated in FIG. 10, the CPU 3010 reads these programs 3011a to 3011g from the ROM 3011 and executes them so that these programs 3011a to 3011g can function as a line information calculating process 3010a, a local correction process 3010b, a global correction process 3010c, a difference calculating process 3010d, a correction selecting process 3010e, a feature value extracting process 3010f, and a feature value storing process 3010g. These processes 3010a to 3010g correspond to the line information calculating unit 301, the local correction unit 302, the global correction unit 303, the difference calculating unit 304, the correction selecting unit 305, and the feature value extracting unit 306, respectively, illustrated in FIG. 2.

Then, the CPU 3010 executes the authentication program using fingerprint image data 3013a and line information data 3013b stored in the RAM 3013.

Additional

The authentication apparatus described in the embodiments can be implemented by a program prepared in advance and executes by a computer such as a personal computer or a workstation. The program can be sent using a network such as the Internet. Furthermore, the program is stored in a computer-readable recording medium, such as a hard disk drive, a flexible disk (FD), a CD-ROM, an MO, a DVD. The computer then reads and executes the program from the above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An authentication apparatus comprising:
a first calculating unit that calculates line information for each region obtained by dividing image data whose feature value extracted from a shape of a line is used for authentication;
a first correction unit that performs a correction on line information indicating the shape of a line contained in a region by using the shape of a local line indicated by line information contained in a neighboring region of the region;
a second correction unit that performs a correction on line information same as line information on which the first correction unit performs the correction, by using the shape of a global line indicated by line information contained in a region larger than the neighboring region;
a second calculating unit that calculates a difference between line information corrected by the first correction unit and line information corrected by the second correction unit; and
an output unit that compares the difference calculated by the second calculating unit with a threshold and, when the difference is less than the threshold, outputs, as line information contained in the image data, line information corrected by the first correction unit and, when the difference is greater than the threshold, outputs, as line information contained in the image data, line information corrected by the second correction unit.

* * * * *